United States Patent
Malinowski et al.

(10) Patent No.: US 10,255,911 B2
(45) Date of Patent: Apr. 9, 2019

(54) SYSTEM AND METHOD OF AUTOMATIC SPEECH RECOGNITION USING PARALLEL PROCESSING FOR WEIGHTED FINITE STATE TRANSDUCER-BASED SPEECH DECODING

(71) Applicant: Intel Corporation, Santa Clara, CA (US)

(72) Inventors: Lukasz M. Malinowski, Gdansk (PL); Piotr Jerzy Majcher, Straszyn (PL); Georg Stemmer, München (DE); Piotr Rozen, Gdansk (PL); Joachim Hofer, Munich (DE); Josef G. Bauer, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/525,893

(22) PCT Filed: Dec. 17, 2014

(86) PCT No.: PCT/PL2014/000142
§ 371 (c)(1),
(2) Date: May 10, 2017

(87) PCT Pub. No.: WO2016/099301
PCT Pub. Date: Jun. 23, 2016

(65) Prior Publication Data
US 2017/0323638 A1 Nov. 9, 2017

(51) Int. Cl.
*G10L 15/00* (2013.01)
*G10L 15/193* (2013.01)
*G10L 15/08* (2006.01)
*G10L 15/34* (2013.01)
*G10L 15/22* (2006.01)

(52) U.S. Cl.
CPC .......... *G10L 15/193* (2013.01); *G10L 15/083* (2013.01); *G10L 15/22* (2013.01); *G10L 15/34* (2013.01)

(58) Field of Classification Search
USPC .................................. 704/231–257, 270–275
See application file for complete search history.

(56) References Cited

U.S. PATENT DOCUMENTS 5,699,456 A * 12/1997 Brown ................... G10L 15/193
382/190
5,794,197 A * 8/1998 Alleva ................... G10L 15/146
704/249

(Continued)

OTHER PUBLICATIONS

International Search Report and Written Opinion for International Patent Application No. PCT/PL2014/000142 dated Sep. 16, 2015, 12 pages.

(Continued)

*Primary Examiner* — Jesse S Pullias
(74) *Attorney, Agent, or Firm* — Green, Howard & Mughal LLP

(57) ABSTRACT

A computer-implemented method of speech recognition comprises forming a weighted finite state transducer (WFST) having nodes associated with states and interconnected by arcs, and to identify at least one word or word sequence hypothesis, identifying multiple sub-graphs on the WFST, each sub-graph having the same arrangement of multiple states and at least one arc, and propagating tokens in parallel through the sub-graphs, where each sub-graph is stored as a supertoken each having an array of tokens.

23 Claims, 9 Drawing Sheets

(56) References Cited

U.S. PATENT DOCUMENTS

| | | | | |
|---|---|---|---|---|
| 6,539,353 | B1 * | 3/2003 | Jiang | G10L 15/142 |
| | | | | 704/252 |
| 6,629,073 | B1 * | 9/2003 | Hon | G10L 15/187 |
| | | | | 704/253 |
| 2011/0145184 | A1 * | 6/2011 | You | G10L 15/34 |
| | | | | 706/52 |

OTHER PUBLICATIONS

Abdelhamid, et al., "SPIDER: A Continuous Speech Light Decoder", 2013 Asia-Pacific Signal and Information Processing Association Annual Summit and Conference, APSIPA, Oct. 29, 2013, 10 pages.

You, et al., "Parallel Scalability in Speech Recognition", IEEE Signal Processing Magazine, IEEE Service Center, Piscataway, NJ, US, vol. 26, No. 6, Nov. 1, 2009, 12 pages.

Young, et al., "Token Passing: A Simple Conceptual Model for Connected Speech Recognition Systems", Cambridge University Engineering Department—Technical Report, Cambridge, GB, vol. 38, Jul. 1, 1989, 23 pages.

Hori, T et al., "Efficient WFST-Based One-Pass Decoding With on-the_Fly Hypothesis Rescoring in Extremely Large Vocabulary Continuous Speech Recognition", IEEE Transactions on Audio, Speech and Language Processing, IEEE Service center, New York, NY, USA, vol. 15, No. 4, May 1, 2007 (May 1, 2007), pp. 1352-1365, XP011177207, ISSN: 1558-7916, DOI: 10.1109/TSAL. 2006.889790 section "Hypothesis Data Management."

International Preliminary Report on Patentability dated Jun. 29, 2017 for PCT Patent Application No. PCT/PL14/00142.

* cited by examiner

FORM A WEIGHTED FINITE STATE TRANSDUCER (WFST) HAVING NODES ASSOCIATED WITH STATES AND INTERCONNECTED BY ARCS, AND TO IDENTIFY AT LEAST ONE WORD OR WORD SEQUENCE HYPOTHESIS
202

IDENTIFY MULTIPLE SUB-GRAPHS ON THE WFST, EACH SUB-GRAPH HAVING THE SAME ARRANGEMENT OF ARCS AND STATES
204

PROPAGATE TOKENS IN PARALLEL THROUGH THE SUB-GRAPHS
206

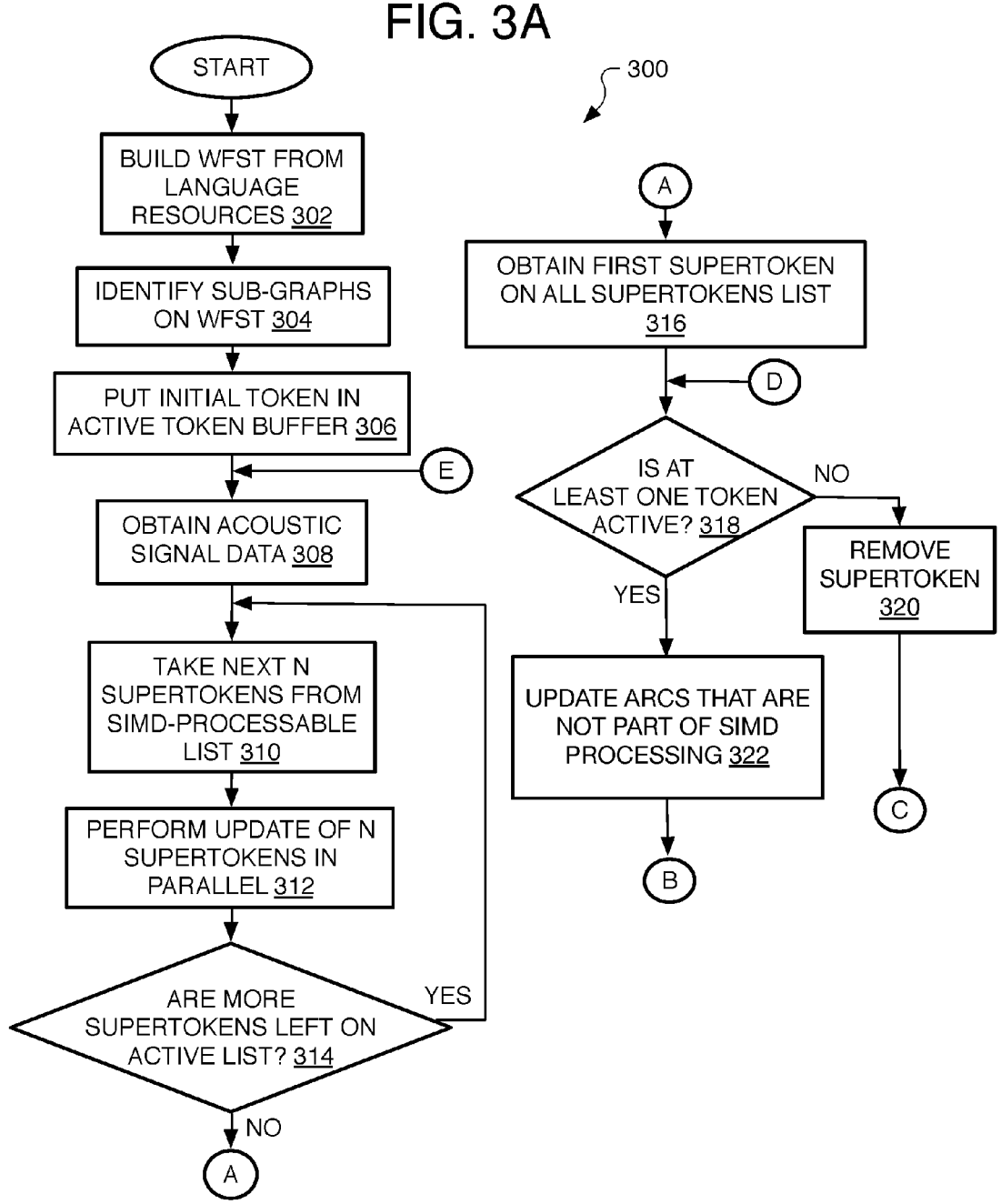

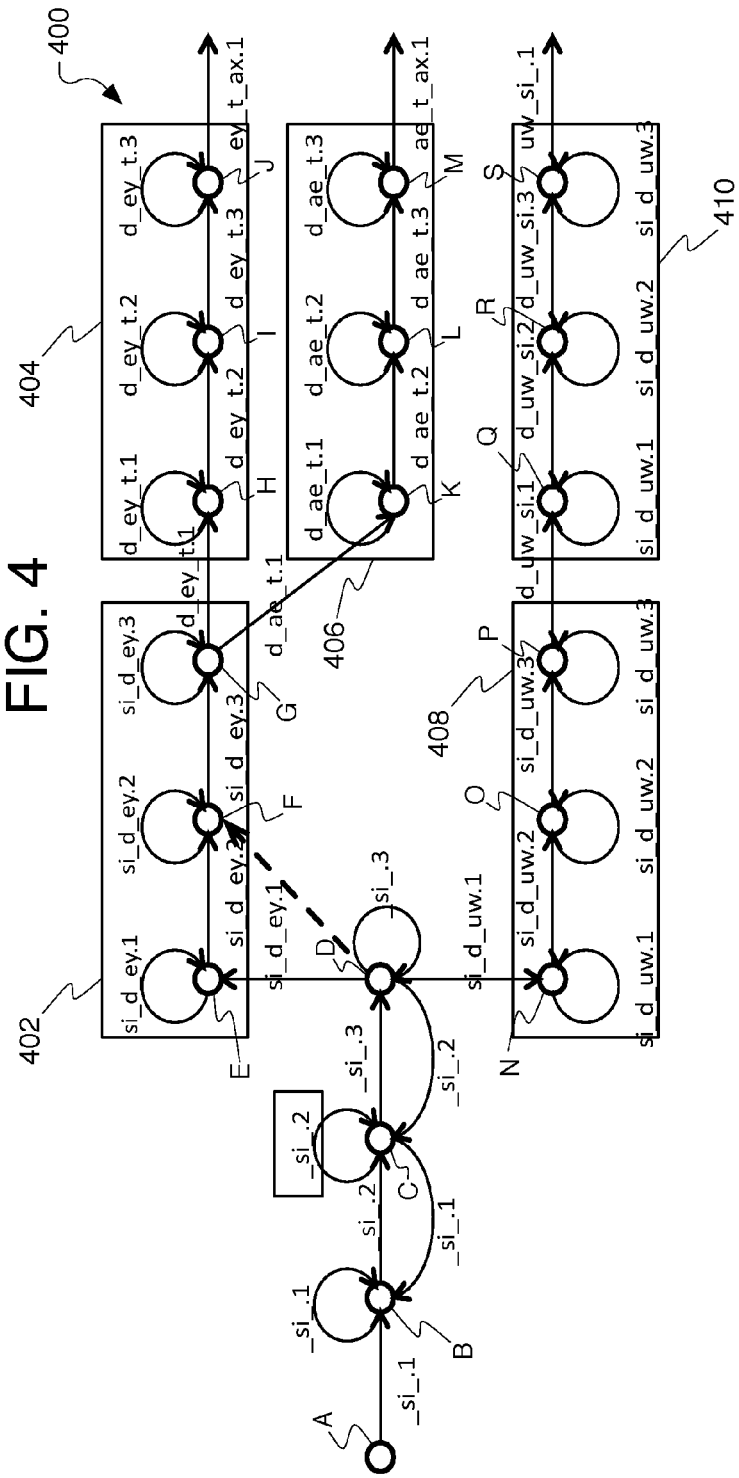

SYSTEM AND METHOD OF AUTOMATIC SPEECH RECOGNITION USING PARALLEL PROCESSING FOR WEIGHTED FINITE STATE TRANSDUCER-BASED SPEECH DECODING

CLAIM OF PRIORITY

This Application is a National Stage Entry of, and claims priority to, PCT Application No. PCT/PL2014/000142, filed on 17 Dec. 2014 and titled "SYSTEM AND METHOD OF AUTOMATIC SPEECH RECOGNITION USING PARALLEL PROCESSING FOR WEIGHTED FINITE STATE TRANSDUCER-BASED SPEECH DECODING," which is incorporated by reference in its entirety for all purposes.

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Some systems also may be configured to understand a fixed set of single word commands, such as for operating a mobile phone that understands the terms call or answer, or for simple data entry phone calls for example.

Thus, automatic speech recognition (ASR) is desirable for wearables, smartphones, and other small devices. Due to the computational complexity of ASR, however, many ASR systems for small devices are server based such that the computations are performed remotely from the device, which can result in a significant delay. Other ASR systems that have on-board computation ability also are too slow, provide relatively lower quality word recognition, and/or consume too much power of the small devices to perform the computations. Thus, a good quality ASR system that provides fast word recognition with lower power consumption is desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a speech recognition process using parallel processing for speech decoding;

FIGS. 3A-3B is a detailed flow chart of a speech recognition process using parallel processing for speech decoding;

FIG. 4 is a diagram of an example WFST decoding graph indicating sub-graphs;

FIG. 5 is a diagram showing the topology of a 3-state hidden Markov model (HMM) representing one phoneme;

DETAILED DESCRIPTION

Figure 1:
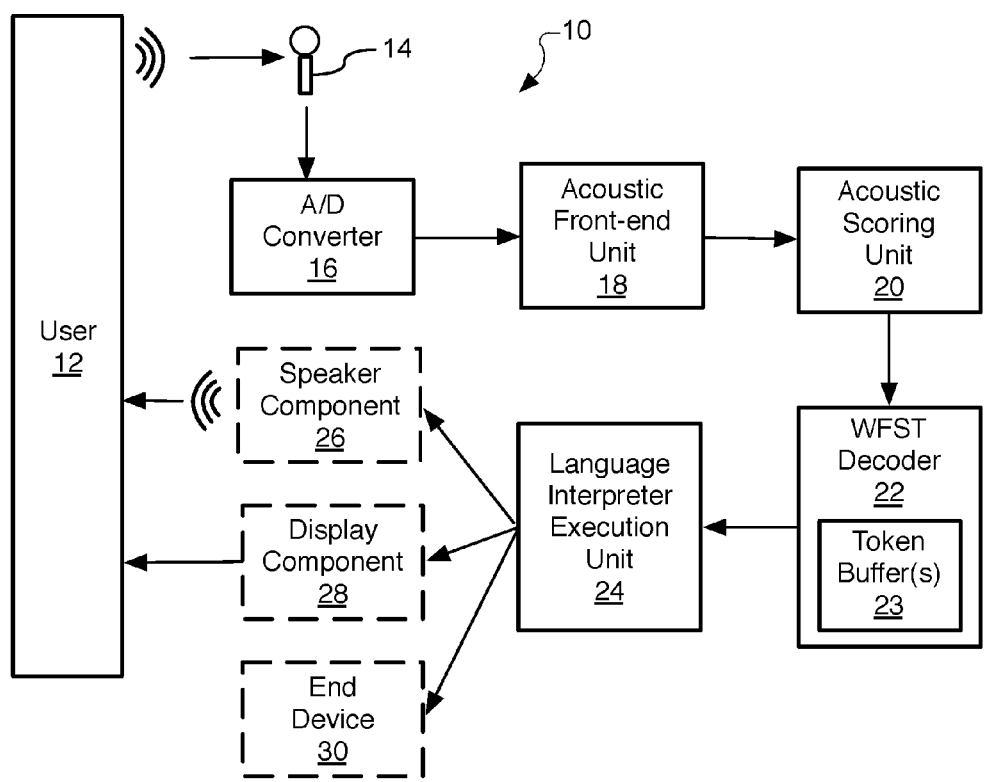
FIG. 1 is a schematic diagram showing an automatic speech recognition system.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, mobile devices such as smartphones, smartwatches, video game panels or consoles, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic speech recognition using parallel processing for weighted finite state transducer-based speech decoding.

As mentioned above, automatic speech recognition (ASR) is a desirable application for many electronic devices including wearable electronics, smartphones, smartwatches, and other small devices, but due to the computational complexity of the ASR, and the relatively low computational capacity as well as the limited power capacity of the small devices, it is difficult to attain high quality, high speed ASR on such small devices. The computational effort of the speech recognition process is dominated by two main steps: (1) acoustic scoring, which usually comprises evaluation of Gaussian Mixture Models (GMM) or neural networks such as deep neural network (DNN), convolutional neural network (CNN), and (2) decoding, or search, which determines spoken words by searching a network of Hidden Markov Model (HMM) states. Often the network is represented by Weighted-Finite-State Transducers (WFSTs) such that the network (or graph, or lattice) used to search for the words is referred to as the WFST.

In order to overcome these disadvantages, previous solutions have solely investigated parallel processing of the acoustic scoring utilizing the regular structure of GMM and DNN/CNN such as that disclosed by Xin Lei et al.: Accurate and Compact Large Vocabulary Speech Recognition on Mobile Devices, Proc. INTERSPEECH 2013. For accelerating the WFST-based decoder phase, it has been proposed to use a Graphics Processing Unit (GPU) such as that disclosed by J. Chong et al.: A Fully Data Parallel WFST-based Large Vocabulary Continuous Speech Recognition on a Graphics Processing Unit. Such a solution, however, does not provide a sufficient ASR system for small devices that do not have a GPU or must use their GPU for other tasks. Additionally, the Chong process adds arcs to build one level expansions on the graph in order to facilitate parallel processing, which adds significant computational costs.

Other difficulties that occur with using parallel processing for ASR, such as with single-instruction multiple data (SIMD), is that WFST-based ASR decoder algorithms are not directly suitable for SIMD parallelization as they include a significant amount of conditional branching and scattered memory access. Conditional branching is not supported in a SIMD programming model and if emulated, it requires a significant amount of overhead because all conditions are executed independent of whether the conditions apply to the data. Even though some SIMD architectures allow scattered memory accesses, on those platforms, a computational overhead is introduced.

Instead, the process disclosed herein addresses the problem to improve the power and computation efficiency of WFST-based ASR by employing two-part decoding with the parallel processing of equivalent sub-graphs in one part, and then decoding the rest of the graph or WFST in a second part. Specifically, sub-graphs are defined on the WFST that may be updated in parallel without altering the structure of the WFST. A sub-graph is a repeating network structure on the WFST that has the same number of states (or nodes) and arcs for one example. The parallel processing of the sub-graphs may be performed by using a single-instruction multiple data (SIMD) whether streaming SIMD extensions (SSE or SSE2) or advanced vector extensions (AVX), or other similar parallel-processing algorithms. With this arrangement, ASR becomes feasible on much smaller platforms. An analogous approach on server platforms will save energy and provide better performance. The details for the disclosed processes are provided below.

Referring now to FIG. 1, an automatic speech recognition system 10 may be a speech enabled human machine interface (HMI). While system 10 may be, or have, any device that processes audio, speech enabled HMIs are especially suitable for devices where other forms of user input (keyboard, mouse, touch, and so forth) are not possible due to size restrictions (e.g. on a smartwatch). On such devices power consumption usually is a critical factor making highly efficient speech recognition implementations necessary. Here, the ASR system 10 may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to provide a digital acoustic signal to an acoustic front-end unit 90. The acoustic front-end unit 90 may perform pre-processing which may include noise cancelling, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The front-end unit 90 also may divide the acoustic signal into frames, by 10 ms frames by one example, and extracts acoustic features or feature vectors from the acoustic signal using fourier transforms and so forth to identify phonemes provided in the signal. An acoustic scoring unit 20 then determines a probability score for the context dependent phonemes that are to be identified.

A weighted finite state transducer (WFST) unit or decoder 22 uses the acoustic scores to identify utterance hypotheses and compute their scores. The WFST decoder 22 uses calculations that may be represented as a network (or graph) that is referred to as the WFST. The WFST has arcs (or edges) and states (at nodes) interconnected by the arcs. The arcs are arrows that extend from state-to-state on the WFST and show a direction of flow or propagation. Additionally, the WFST decoder 22 may dynamically create a word or word sequence hypothesis, which may be in the form of a word lattice that provides confidence measures, and in some cases, multiple word lattices that provide alternative results. The WFST decoder 22 forms a WFST that may be determinized, minimized, weight or label pushed, or otherwise transformed (e. g. by sorting the arcs by weight, input or output symbol) in any order before being used for decoding. The WFST may be a deterministic or a non-deterministic finite state transducer that may contain epsilon arcs. The WFST may have one or more initial states, and may be statically or dynamically composed from a lexicon WFST (L) and a language model or a grammar WFST (G). Alternatively, the WFST may have lexicon WFST (L) which may be implemented as a tree without an additional grammar or language model, or the WFST may be statically or dynamically composed with a context sensitivity WFST (C), or with an HMM WFST (H) that may have HMM transitions, HMM state IDs, GMM densities, or DNN output state IDs as input symbols. By the present example as explained below, the WFST is searched for, and has portions ordered in, sub-graphs before token propagation calculations proceed. After propagation, the WFST may contain one or more final states that may have individual weights. The WFST decoder 22 uses known specific rules, construction, operation, and properties for single-best speech decoding, and the details of these that are not relevant here are not explained further in order to provide a clear description of the arrangement of the new features described herein. The WFST based speech decoder used here may be one similar to that as described in "Juicer: A Weighted Finite-State Transducer Speech Decoder" (Moore et al., 3$^{rd}$ Joint Workshop on Multimodal Interaction and Related Machine Learning Algorithms MLMI '06).

A hypothetical word sequence or word lattice may be formed by the WFST decoder by using the acoustic scores and token passing algorithms to form utterance hypotheses. A single token represents one hypothesis of a spoken utterance and represents the words that were spoken according to that hypothesis. During decoding, several tokens are placed in the states of the WFST, each of them representing a different possible utterance that may have been spoken up to that point in time. At the beginning of decoding, a single token is placed in the start state of the WFST. During discrete points in time (so called frames), each token is transmitted along, or propagates along, the arcs of the WFST. If a WFST state has more than one outgoing arc, the token is duplicated, creating one token for each destination state. If the token is passed along an arc in the WFST that has a non-epsilon output symbol (i. e. the output is not empty, so that there is a word hypothesis attached to the arc), the output symbol may be used to form a word sequence hypothesis or word lattice. In a single-best decoding environment, it is sufficient to only consider the best token in each state of the WFST. If more than one token is propagated into the same state, recombination occurs where all but one of those tokens are removed from the active search space so that several different utterance hypotheses are recombined into a single one. The output symbols may be collected, depending on the type of WFST, during or after the token propagation to form one most likely word lattice or alternative word lattices.

The output word lattice or lattices are made available to a language interpreter and execution unit (or interpretation engine) 24 to determine the user intent. This intent determination or spoken utterance classification may be based on decision trees, form filling algorithms or statistical classification (e. g. using SVNs or deep neural networks (DNNs)).

Once the user intent is determined for an utterance, the interpretation engine 24 also may output a response or initiate an action. The response may be in audio form through a speaker component 26, or in visual form as text on a display component 28 for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smartphone or smartwatch may initiate performance of certain tasks on the smartphone. The end device 30 may simply be software instead of a physical device or hardware or any combination thereof, and is not particularly limited to anything except to have the ability to understand a command or request resulting from a speech recognition determination and to perform or initiate an action in light of that command or request.

Referring to FIG. 2, an example process 200 for a computer-implemented method of speech recognition is provided. In the illustrated implementation, process 200 may include one or more operations, functions or actions as illustrated by one or more of operations 202 to 206 numbered evenly. By way of non-limiting example, process 200 may be described herein with reference to example speech recognition devices described herein with any of FIGS. 1 and 4-9, and where relevant.

Process 200 may include "form a weighted finite state transducer (WFST) having nodes associated with states and interconnected by arcs, and to identify at least one word or word sequence hypothesis" 202. In other words, this operation is directed to the performance of speech decoding with a token passing algorithm utilizing a weighted finite state transducer (WFST) and to generate a single or more utterance hypotheses or one or more word lattices.

Process 200 also may include "identify multiple sub-graphs on the WFST, each sub-graph having the same arrangement of arcs and states" 204. This identifies the sections of the WFST that may be processed in parallel. Sets of tokens that are present in a single sub-group may be referred to as supertokens that are each stored as a group or array of the same number of tokens (associated with the states), and placed in consecutive memory addresses for fast parallel processing.

Process 200 also may include "propagate tokens in parallel through the sub-graphs" 206, and particularly by determining which sub-graphs, have an active token, or supertoken, on a current frame, and then processing those supertokens with active tokens on the same frame in parallel. Parallel processing such as SIMD may be used as mentioned herein. The tokens positioned on the WFST external to all of the sub-graphs may be processed by non-parallel (e.g., SISD) processing. These portions of the WFST may be referred to as non-sub-graph portions.

Figure 3B:
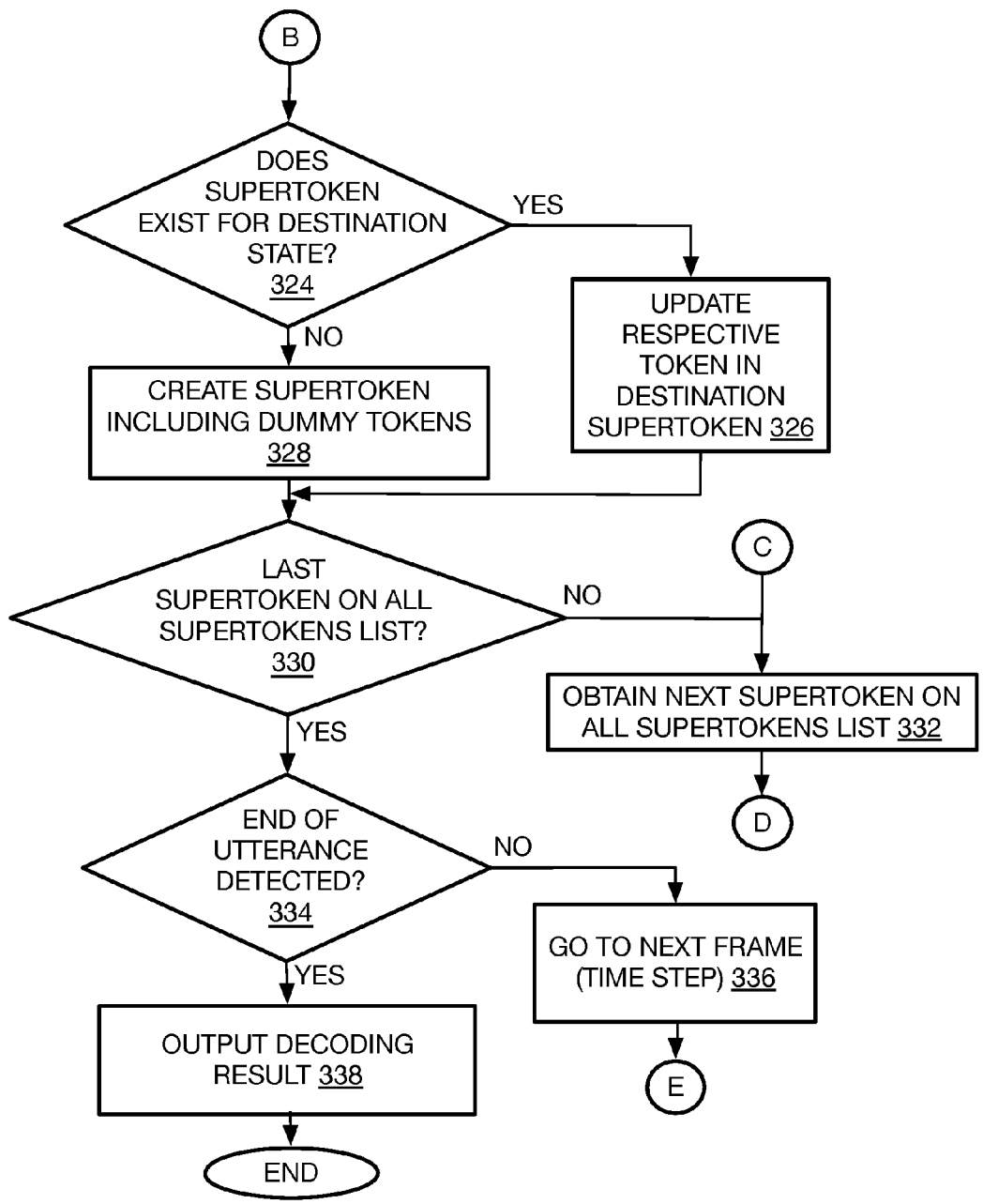

Referring to FIGS. 3A-3B, an example computer-implemented process 300 for automatic speech recognition using parallel processing for weighted finite state transducer-based speech decoding is provided. Process 300 also may be referred to as a token passing algorithm where several tokens are passed through a decoder network in a time-synchronous manner. In the illustrated implementation, process 300 may include one or more operations, functions or actions as illustrated by one or more of operations 302 to 340 numbered evenly. By way of non-limiting example, process 300 may be described herein with reference to example speech recognition devices described herein with any of FIGS. 1 and 4-9, and where relevant.

Process 300 may include building 302 a WFST from language resources. As mentioned above, this may include the use of a lexicon, a statistical language model or a grammar and phoneme context dependency and HMM state topology information. The generated WFST resource may be a single, statically composed WFST or two or more WFSTs to be used with dynamic composition.

Referring to FIG. 4, part of one example decoding graph or WFST 400 with nodes (or states) A to S, and for the utterance including the words "data" ('d ey t ax' or 'd ae t ax') and dew ('d uw') with a non-optional silence HMM before the word HMMs. The silence HMM is formed by states (or nodes) A to D of WFST 400 with an initial state A. One branch forms the word data on states E to M, and another branch for the word dew on states N to S. Each arc may be designated by its source and destination state such that arc AB is the arc from state A to state B, and the self-loop at each state is designated as both source and destination of the letter of its state such that the self-loop at state B is indicated as BB, the self-loop at state C is CC, and so forth. The silence portion A to D also has backward repeating arcs DC and CB. Each arc has an output label that includes a phoneme combination, or word part combination, and a number that indicates the part of a 3-state HMM (1 for beginning, 2 for middle, 3 for end). The WFST also contains phoneme context dependency information. Thus, for the arc FG for example, the input is si_d_ey.3, indicating that the phoneme d is preceded by silence and followed by an ey phoneme, and at the end (third) position of the 3-state HMM.

Process 300 then may include "identify sub-graphs on the WFST" 304 to find suitable sub-graphs for parallel (and in the present example, SIMD) computations. By one approach, the sub-graphs may be any structure of states (or nodes) and arcs as long as the structure is the same for all of the sub-graphs. In one form, the system only searches for a single, specific sub-graph structure on the WFSTs and that must be the same for all utterances being analyzed. By other examples, there may be a set of possible sub-graph structures with differing numbers or arrangements of states, and whichever sub-graph structure has the most number of occurrences in the WFST is used for that WFST. Alternative sub-graph arrangements may be selected additionally or alternatively based on lowest computational cost. By one example, the most common HMM topology, usually the one used for phonemes, is used as a sub-graph. This type of sub-graph can implicitly be found in the WFST during its creation, as the states in the WFST before composing the HMM WFST correspond to the sub-graphs in the composed WFST.

Referring to FIG. 5, one example sub-graph 500 may be the 3-state HMM which is often used in automatic speech recognition as a basic building block. The example sub-graph of a 3-state HMM has three states 502, 504, and 506, interconnected by arcs 508, 510, and here, where each state has a self-loop 512, 514, 516 that contributes the probability of a prolonged phoneme.

WFST 400 also is shown with identified sub-graphs 402, 404, 406, 408, and 410. Each sub-graph has the same number of states, and the same number and arrangement of arcs interconnecting the states, at least between one start state (state E for example sub-graph 402) and at least one end state (state G for example sub-graph 402) of each sub-graph. The sub-graphs, however, may have different numbers of arcs entering the sub-graph and to the start state(s) of the sub-graph, and from the end state(s) of the sub-graph and exiting the sub-graph. It will be understood that the sub-graphs may have many different structures and may be processed or updated in parallel as long as the structures are the same. By one example, the minimum structure may be two states and one arc between the states or a single state, which is both the start and the end state of the sub-graph, with a self-loop (i.e. an arc from the state to itself).

Figure 6:
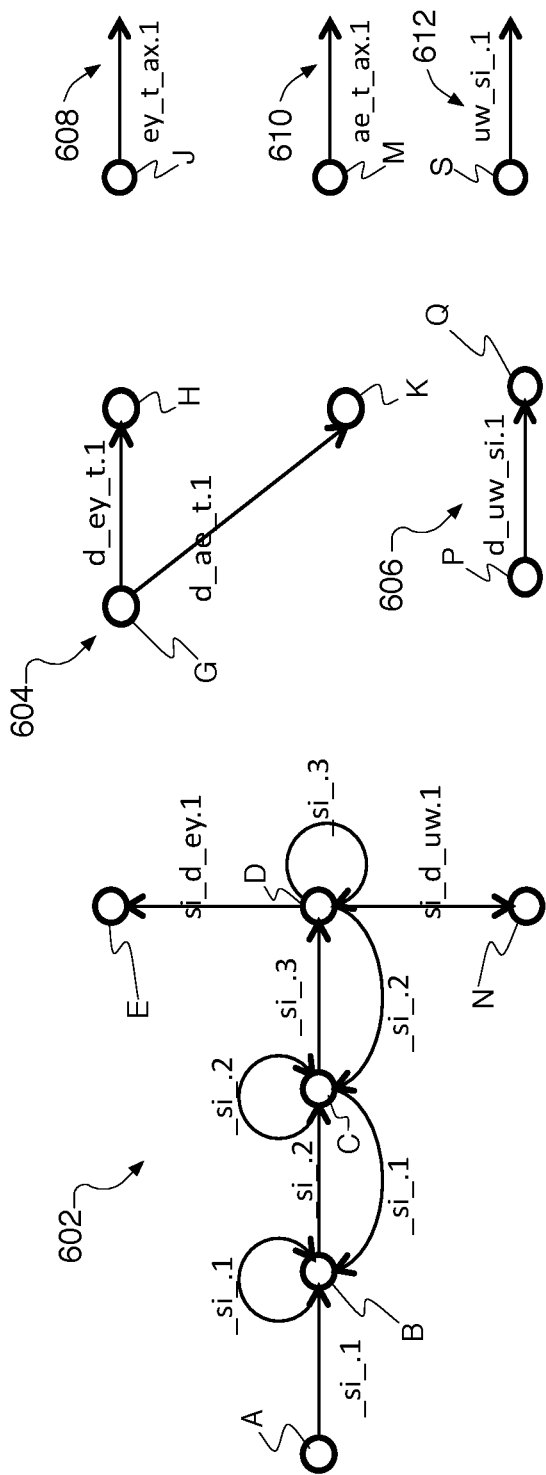
FIG. 6 is a diagram defining non-sub-graph portions of the example WFST decoding graph.

Referring to FIG. 6, the non-sub-graph portions of the WFST, which by this example may be portions 602, 604, 606, 608, 610, 612, and 614 of the WFST 400, may be processed chronologically before, during, or after the sub-graph portions of the WFST are processed. By one example, the non-sub-graph portions may be updated after the parallel updating operations performed on active supertokens in a current frame are complete. The updates in these remaining parts are performed using a conventional state-of-the art decoding algorithm, such as token passing.

To begin propagating tokens through the WFST, process 300 may include putting 306 an initial token in an active token buffer. In one form, the token will be placed in the initial state of the WFST which corresponds to state A in the example of WFST 400. By one example, the token in the initial state of the WFST is a part of a supertoken that may encompass one or more states in the WFST. On WFST 400 that supertoken may contain tokens for state A only, or alternatively it may contain tokens for e.g. states A, B, C and D. In the latter case, dummy tokens are placed on the states B, C, and D as there are not yet any active tokens for those states.

It will be appreciated that the input labels of an arc may be the possibly context dependent phoneme, HMM, GMM density, DNN state or other acoustic ID, depending on the type of WFST used for decoding. The inputs are used to determine the acoustic score applied to a token that is propagated along the arc. The output labels of the arcs represent spoken words or other sentence fragments. If an output label of an arc is not epsilon (empty), and a token is passed along said arc, then the corresponding word or sentence fragment is appended to the utterance hypothesis of the token. Thus, for example, if the output of an arc is the word "I" meaning that if a token is passed along the arc, then the underlying utterance hypothesis contains the word "I".

Also, the active token buffer, such as buffer 726 (FIG. 7), may hold the tokens for the frames to be analyzed. Thus, there may be multiple token buffers such as one buffer for each frame. By one approach, this includes at least two token buffers including a current token buffer holding active tokens of the current frame, and a next token buffer holding the tokens of the next frame to be activated. In a different approach there may be only one token buffer which may be organized as a ring that holds both, tokens for the current and the next frame. This buffer may include a marker that separates current tokens from future tokens. By one example, the token buffer(s) contain supertokens which encompass several tokens. The active token buffer(s) may be separated into two components, one that holds active supertokens that represent sub-graphs. These supertokens may be processed in parallel using SIMD instructions. The second component of the active token buffer(s) contain tokens or supertokens that represent parts of the WFST that are not parts of any sub-graph.

The system maintains a list of active supertokens. A supertoken is considered active if there is at least one active token in a state of the corresponding sub-graph. To be placed on the active supertoken list, it does not matter which token or tokens are active within the sub-graph. Thus, for example, it does not matter whether the token at state E, F, or G, or any combination of them in sub-graph 402 is active as long as at least one of the states has an active token. The list does not have to be ordered in any way. The order of the list will typically depend on the order in which supertokens are created by the token passing algorithm.

This operation may include storing the active supertokens in consecutive memory addresses in order to remove the need for scattered memory accesses for parallel processing. Thus, elements of the supertokens that may be processed in parallel can be placed in adjacent memory locations. In that way, a single supertoken may not be stored in one consecutive array of memory but rather be scattered to improve SIMD processing. More details are provided below. The following example table of supertokens assists to show the memory organization with dummy tokens:

| Memory location | Memory content |
|---|---|
| 1 | Supertoken 1 score of first state: 1111 |
| 2 | Supertoken 2 score of first state: 2222 |
| 3 | Supertoken 3 score of first state: 3333 |
| 4 | Supertoken 4 score of first state: $-\infty$ |
| 5 | Supertoken 1 score of second state: 4444 |
| 6 | Supertoken 2 score of second state: $-\infty$ |
| 7 | Supertoken 3 score of second state: 5555 |
| 8 | Supertoken 4 score of second state: 6666 |
| 9 | Supertoken 1 score of third state: 7777 |
| 10 | Supertoken 2 score of third state: 8888 |
| 11 | Supertoken 3 score of third state: 9999 |
| 12 | Supertoken 4 score of third state: 1515 |
| 13 | Supertoken 5 score of first state: 2626 |
| 14 | Supertoken 6 score of first state: 3737 |
| ... | ... |

Using such a data structure, if for example a constant is to be added to the scores of all tokens in the first state of all supertokens, memory locations 1, 2, 3 and 4 can be read simultaneously with one memory access, the constant added with a SIMD addition and then the sum written back with a single store. That way, only three instructions are needed to update the scores of four tokens.

Another approach is to have a separate array for each variable of the supertoken. For the purpose of the SIMD instructions, it is more convenient to use a structure of arrays instead of an array of structures. Different SIMD instructions can process different amount of supertokens at the same time, so using separate arrays would be more flexible for changing SIMD instructions (AVX/AVX2/GPU) as below where N is the number of supertokens.

| Memory location | Memory content |
|---|---|
| 1 | Supertoken 1 score of first state: 1111 |
| 2 | Supertoken 2 score of first state: 2222 |
| 3 | Supertoken 3 score of first state: 3333 |
| ... | ... |
| N | Supertoken N score of first state: 4444 |
| 1 + N | Supertoken 1 score of second state: 4444 |
| 2 + N | Supertoken 2 score of second state: $-\infty$ |
| 3 + N | Supertoken 3 score of second state: 5555 |
| ... | ... |
| 2N | Supertoken N score of second state: 6666 |
| 1 + 2N | Supertoken 1 score of third state: 7777 |
| 2 + 2N | Supertoken 2 score of third state: 8888 |
| 3 + 2N | Supertoken 3 score of third state: 9999 |
| ... | ... |
| 3N | Supertoken N score of third state: 1010 |
| ... | ... |

Tokens on states that are not parts of any sub-graphs may either be stored individually or as a part of a supertoken. Those supertokens may contain a single, two or more tokens and may be arranged in any order in memory. As those tokens are not processed using SIMD instructions, the memory layout may be chosen in a way that is most convenient and no special concern for adjacency is required. In one example, each supertoken is stored in a single structure stored in one continuous block of memory.

Process 300 may include obtaining 308 acoustic signal data. As mentioned above, this may include the use of a sound or audio capture device, pre-processing of the acoustic signal, feature extraction by a front-end unit, and acoustic scoring by an acoustic scoring unit. By one approach, the feature extraction and acoustic scoring occurs before the WFST decoding begins. By another example, the acoustic scoring may occur just in time. If scoring is performed just in time, it may be performed on demand, such that only scores that are needed during WFST decoding are computed.

Process 300 then may include "take next N supertokens from SIMD-processable list" 310. Thus, the simultaneous processing of supertokens that correspond to sub-graphs may be limited to a number N of supertokens at one time so as to not overload a designated capacity of the processors. N depends on the width of the SIMD registers used and the number of bits used for the data in the supertokens. If, for example, token scores are represented by 32 bit and SSE2 streaming SIMD instructions (128 bit registers) are used, then N is set to 4. If values are represented by 16 bit and AVX2 instructions (256 bit registers) are used, then N is set to 16. With 8 bit values and AVX-1024, N would be 128. As any combination of value bit depth and register length is possible, N may vary greatly depending on the platform and the accuracy required by the application. N may be less than all of the identified active supertokens on a particular frame (or time point), and may be processed N supertokens at a time, and in an order as the supertokens are listed on the active supertoken list for the frame.

Process 300 may comprise "perform update of N supertokens in parallel" 312, and by one form, the first N supertokens on the active supertoken list for the frame to be processed using SIMD. In order to be able to use SIMD instructions for some parts of the decoding, the SIMD processing is provided only to perform token passing through, or on, equivalent sub-graphs of the decoding graph. The core token passing algorithm may include deriving an acoustic score for the arc that the token is traveling, which may include adding the old (prior) score+arc (or transition) weight+acoustic score of a destination state. The SIMD updating algorithms on a single frame will move each token from all N supertokens that are processed in parallel along one arc, and by one example form, this update may apply to any one arc in the sub-graph for those arcs that have both a source state and destination state within the sub-graph. As all sub-graphs have the same topology, each token can be processed along the same arc for all N supertokens, which allows the use of SIMD instructions. For destination states in the sub-graphs that only have a single incoming arc, the parallel calculation may stop here.

As mentioned, however, the sub-graphs may include many different arrangements including those where multiple arcs have the same destination state. For example, WFST 400 may have an arc DF (shown in dashed line for emphasis) as well as arc EF that both end at destination state (or node) F. When a destination state with more than one incoming arc is processed, and after the new scores are determined for each token propagated along those arcs, then the scores for tokens that have the same destination state may be compared to determine which token will be dropped and which will be propagated to the destination state. As all sub-graphs share the same topology, this update can be performed for N sub-graphs simultaneously.

When in process 300 multiple tokens reach the same destination state, there is a possible recombination because both tokens are in the same WFST state. For conventional processing, once it is determined that the merging tokens have the same state, the token with the worse acoustic score will be dropped to recombine in the conventional systems during SISD. In one case, the token which is dropped is now removed. This is often achieved by a comparison operation of the scores and a conditional branch where one of the conditions removes the first token whereas the other removes the second one.

Here, however, the comparison is handled differently for parallel processing as conditional branching must be eliminated to facilitate SIMD instructions. This is possible, as all tokens are present in a supertoken as dummy tokens which are used to fill up the data structure. Thus, it is not necessary to check whether a token is present or not, and branch-equivalent SIMD instructions may be used. An SSE2 example implementation is provided for arcs "A" and "B" (which could be any arcs of a sub-graph sharing a destination state such as DF and EF) using four sub-graphs just for this example so that N=4. This example assumes that transition weights and acoustic scores are stored in consecutive memory according to the supertoken WFST states. This can be achieved by copying those values to the supertokens before SIMD processing. A different approach would be to use SIMD gather instructions like _mm256_i32gather_epi32:

```
newScoreA=_mm_add_epi32(scoreA, transitionWeightA);
newScoreB=_mm_add_epi32(scoreB, transitionWeightB);
mask=_mm_cmpgt_epi32(newScoreA, newScoreB);
newScoreA=mm_and_si128(mask, newScoreA);
newScoreB=mm_andnot_si128(mask, newScoreB);
newScore=mm_or_si128(newScoreA, newScoreB);
newScore=_mm_add_epi32(newScore, destinationAcousticScore);
newTokenDataA=mm_and_si128(mask, tokenDataA);
newTokenDataB=mm_andnot_si128(mask, tokenDataB);
newTokenData=mm_or_si128(newTokenDataA, newTokenDataB);
```

Using this code, determining which token or tokens should be dropped at a common destination state of multiple tokens within the sub-graph is performed by using a choosing mask that adjusts the integer values of the acoustic scores being used for the determination. Particularly, the mask may be used to combine acoustic scores of multiple tokens into a single acoustic score.

While SIMD parallel processing is used for the disclosed examples, it will be understood that the present system and method may be operated by using other alternatives such as field-programmable gate array (FPGA) or general-purpose computing graphics processing unit (GPGPU) to name a few examples.

Process 300 then may include "are more supertokens left on active list?" 314, which is a check to determine whether there are more active supertokens on the active supertoken list for supertokens that may be processed in parallel. If so the, process loop to operation 310 to take and analyze the next N active supertokens on the list. This repeats until all of the supertokens have been processed with respect to the sub-graphs of the WFST. Thus, tokens have been moved along all the arcs that are inside one of the sub-graphs. The tokens still have to be propagated along arcs that are not part of any sub-graph. This is done in a second step that is detailed below. As there is no common topology in the WFST for those arcs, the following steps are performed using SISD instructions and tokens which may be part of supertokens or which may be stored individually are propagated one at a time.

Once all of the active supertokens on the active parallel supertokens list have been updated according to the sub-graphs, process 300 may provide operations to propagate one or more tokens on the portions of the WFST external to the sub-graphs. For this, an "all supertokens" list is used that includes the supertokens that were processed in parallel before and possibly also supertokens that correspond to non-sub-graph parts of the WFST and/or individual tokens.

In order to simplify the description, individual tokens will also be referred to as supertokens in the following. Thus, process 300 may comprise "obtain first supertoken on all supertokens list" 316 to begin to update tokens along the non-sub-graph arcs. Additionally, process 300 may include "is at least one token active?" 318, and referring to the tokens of the first supertoken on the all supertokens list and that is being analyzed. If not, the supertoken is removed 320 from the active supertokens list, and the next supertoken on the "all" list is obtained (332).

If the supertoken has at least one active token, process 300 then may include "process arcs that are not part of SIMD processing" 322. This is considered the second decoding step that handles token passing between sub-graphs to be performed in a classic sequential manner using SISD instructions. For instance, while referring to example WFST 400, tokens on sub-graphs 402 and 408, as well as on non-sub-graph portions 604 and 606 (FIG. 6) of the WFST, may be active, and assuming that propagation along sub-graphs 402 and 408 using SIMD is now complete, next the tokens may be propagated along the active non-sub-graph portions 604 and 606.

Process 300 then may perform recombination operations occurring due to propagation of tokens along arcs that are not part of the sub-graphs. Particularly, process 300 may include "does supertoken exist for destination state?" 324 to determine whether the non-sub-graph arc of the WFST ends in a state for which a supertoken is active. This is done in order to allow recombination with the active supertoken. If the supertoken exists, the process 300 may comprise "update respective token in destination supertoken" 326 where the respective token is the one for the state that the arc ends in, and using SISD or other similar algorithms.

If a supertoken does not already exist in the destination state of the non-sub-graph arc, process 300 may include "create new supertoken including dummy tokens" 328. As mentioned, in this case, where only a single active token exists in a supertoken, dummy tokens which may have a score of minus infinity are used to fill up the supertoken. This is necessary to allow the SIMD computations to be performed as stated above.

Then it is determined 330 whether the supertoken is the last active supertoken on the all supertokens list for non-parallel processing. If not, the process continues with "obtain next supertoken on all supertokens list" 332, and the process loops so that operations 318 to 322 are repeated to update the all supertokens by removing supertokens without an active token, and update the scores due to propagation along non-sub-graph arcs. This loop repeats until the last supertoken of the list is updated.

If no more supertokens are to be updated for the frame, process 300 may include "end of utterance detected?" 334. If not detected, process 300 may include "go to next frame (time step)" 336. Thus, once the active token buffer is empty for the current frame, the process 300 swaps the current active token buffer for the next frame token buffer. If the end of the utterance is not reached, the process 300 loops back to repeat the token propagation for the next frame, which becomes the current frame, and calculates acoustic features again (operation 308) to restart the process. The process 300 repeats for each or multiple frames until either the audio input is completely processed or the end of the utterance was detected. End of utterance detection may be done by voice activity detection (VAD), stable times of utterance hypotheses, timeouts or any other methods that are suitable to determine if a speaker has finished talking.

Once the end of the utterance is detected 334, the process 300 then may include "output decoding result" 338, and this may be a single best word or word sequence, or by one example, one or more word lattices may be provided to the interpretation engine to determine the best word sequence from those presented by the word lattice.

It will be appreciated that processes 200 and/or 300 may be provided by sample ASR systems 10 and/or 700 to operate at least some implementations of the present disclosure. This includes operation of an acoustic front-end unit 708, acoustic scoring unit 710, WFST decoder 712, and language interpreter execution unit 714, as well as others, in speech recognition processing system 700 (FIG. 7) and similarly for system 10 (FIG. 1).

In addition, any one or more of the operations of FIGS. 2-3 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 7:
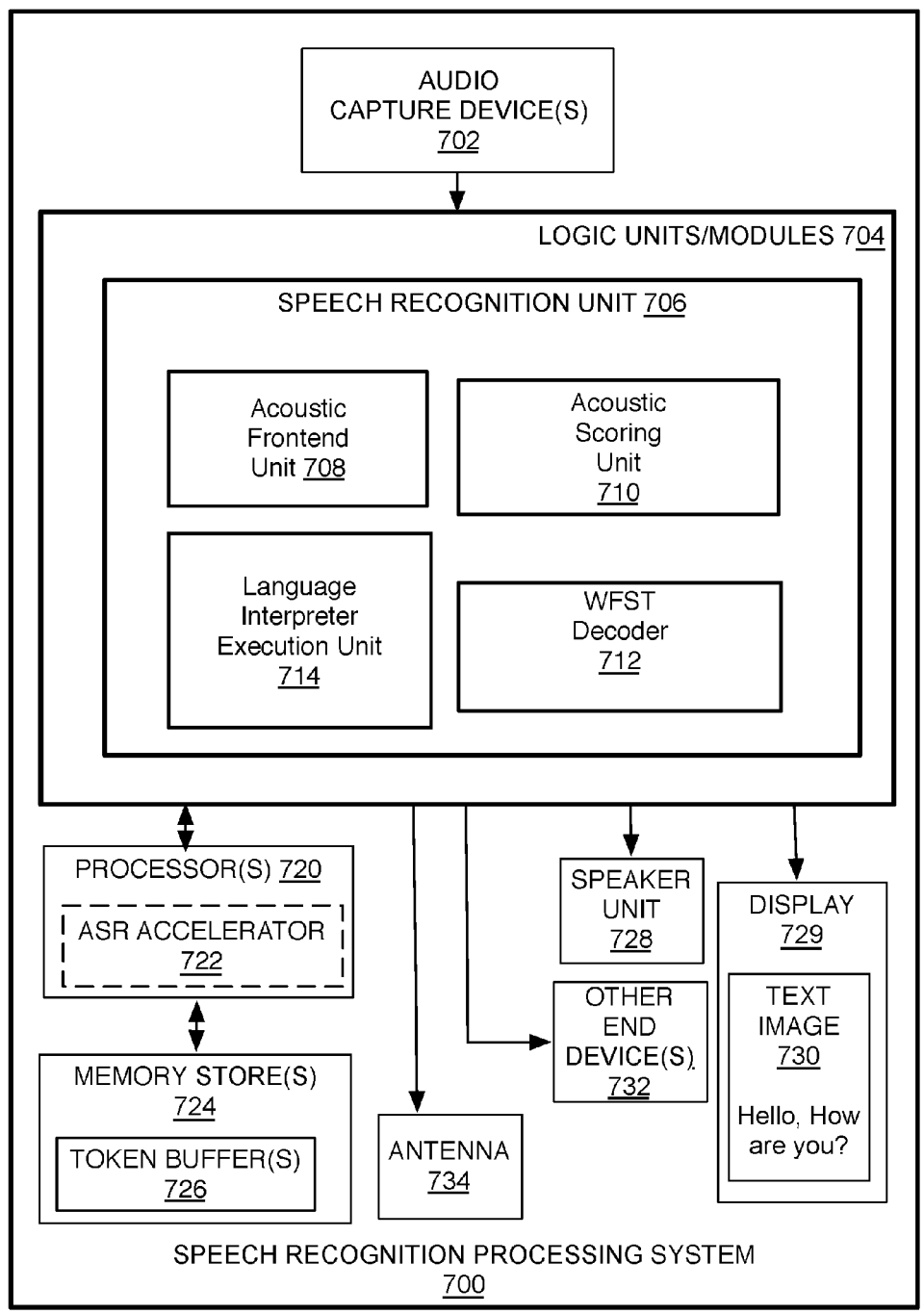
FIG. 7 is an illustrative diagram of an example system.

Referring to FIG. 7, an example speech recognition system 700 is arranged in accordance with at least some implementations of the present disclosure. In various implementations, the example speech recognition processing system 700 may have an audio capture device(s) 702 to form or receive acoustical signal data. This can be implemented in various ways. Thus, in one form, the speech recognition processing system 700 may be an audio capture device such as a microphone, and audio capture device 702, in this case, may be the microphone hardware and sensor software, module, or component. In other examples, speech recognition processing system 700 may have an audio capture device 702 that includes or may be a microphone, and logic modules 704 may communicate remotely with, or otherwise may be communicatively coupled to, the audio capture device 702 for further processing of the acoustic data.

In either case, such technology may include a telephone, a smartphone or smartwatch, a dictation machine, other sound recording machine, a mobile device or an on-board device, or any combination of these. The speech recognition or WFST decoder used herein enables ASR for the ecosystem on small-scale CPUs (wearables, smartphones) since the present systems and methods do not require connecting to the cloud to perform the token propagation as described herein. In datacenter ASR applications, this method would decrease the cost of WFST decoding due to reduced energy consumption and allow speech recognition vendors to use larger models for increased accuracy.

Thus, in one form, audio capture device 702 may include audio capture hardware including one or more sensors as well as actuator controls. These controls may be part of a sensor module or component for operating the sensor. The sensor component may be part of the audio capture device 702, or may be part of the logical modules 704 or both. Such sensor component can be used to convert sound waves into an electrical acoustic signal. The audio capture device 702 also may have an A/D converter, other filters, and so forth to provide a digital signal for speech recognition processing.

In the illustrated example, the logic modules 704 may include an acoustic front-end unit 708 that provides pre-processing as described with unit 90 (FIG. 1) and that identifies acoustic features, an acoustic score unit 710 that provides acoustic scores for the acoustic features, a WFST decoder 712 that provides a word sequence hypothesis, which may be in the form of a word lattice as described herein, and a language interpreter execution unit 714 that determines the user intent and reacts accordingly. The WFST decoder unit 712 may be operated by, or even entirely or partially located at, processor(s) 720, and which may include, or connect to, an accelerator 722 to perform at least the WFST decoding with parallel processing or acoustic scoring or both. The logic modules may be communicatively coupled to the components of the audio capture device 702 in order to receive raw acoustic data. The logic modules 704 may or may not be considered to be part of the audio capture device.

The speech recognition processing system 700 may have one or more processors 720 which may include the accelerator 722, which may be a dedicated accelerator, and one such as the Intel Atom, memory stores 724 which may or may not hold the token buffers 726 as well as word histories, phoneme, vocabulary and/or context databases, and so forth, at least one speaker unit 728 to provide auditory responses to the input acoustic signals, one or more displays 729 to provide images 730 of text or other content as a visual response to the acoustic signals, other end device(s) 732 to perform actions in response to the acoustic signal, and antenna 734. In one example implementation, the speech recognition system 700 may have the display 729, at least one processor 720 communicatively coupled to the display, at least one memory 724 communicatively coupled to the processor and having a token buffer 726 by one example for storing the tokens as explained above. The antenna 734 may be provided for transmission of relevant commands to other devices that may act upon the user input. Otherwise, the results of the speech recognition process may be stored in memory 724. As illustrated, any of these components may be capable of communication with one another and/or communication with portions of logic modules 704 and/or audio capture device 702. Thus, processors 720 may be communicatively coupled to both the audio capture device 702 and the logic modules 704 for operating those components. By one approach, although speech recognition system 700, as shown in FIG. 7, may include one particular set of blocks or actions associated with particular components or modules, these blocks or actions may be associated with different components or modules than the particular component or module illustrated here.

As another alternative, it will be understood that speech recognition system 700, or the other systems described herein (such as system 800), may be a server, or may be part of a server-based system or network rather than a mobile system. Thus, system 700, in the form of a server, may not have, or may not be directly connected to, the mobile elements such as the antenna, but may still have the same components of the speech recognition unit 706 and provide speech recognition services over a computer or telecommunications network for example. Likewise, platform 802 of system 800 may be a server platform instead. Using the disclosed speech recognition unit on server platforms will save energy and provide better performance.

Figure 8:
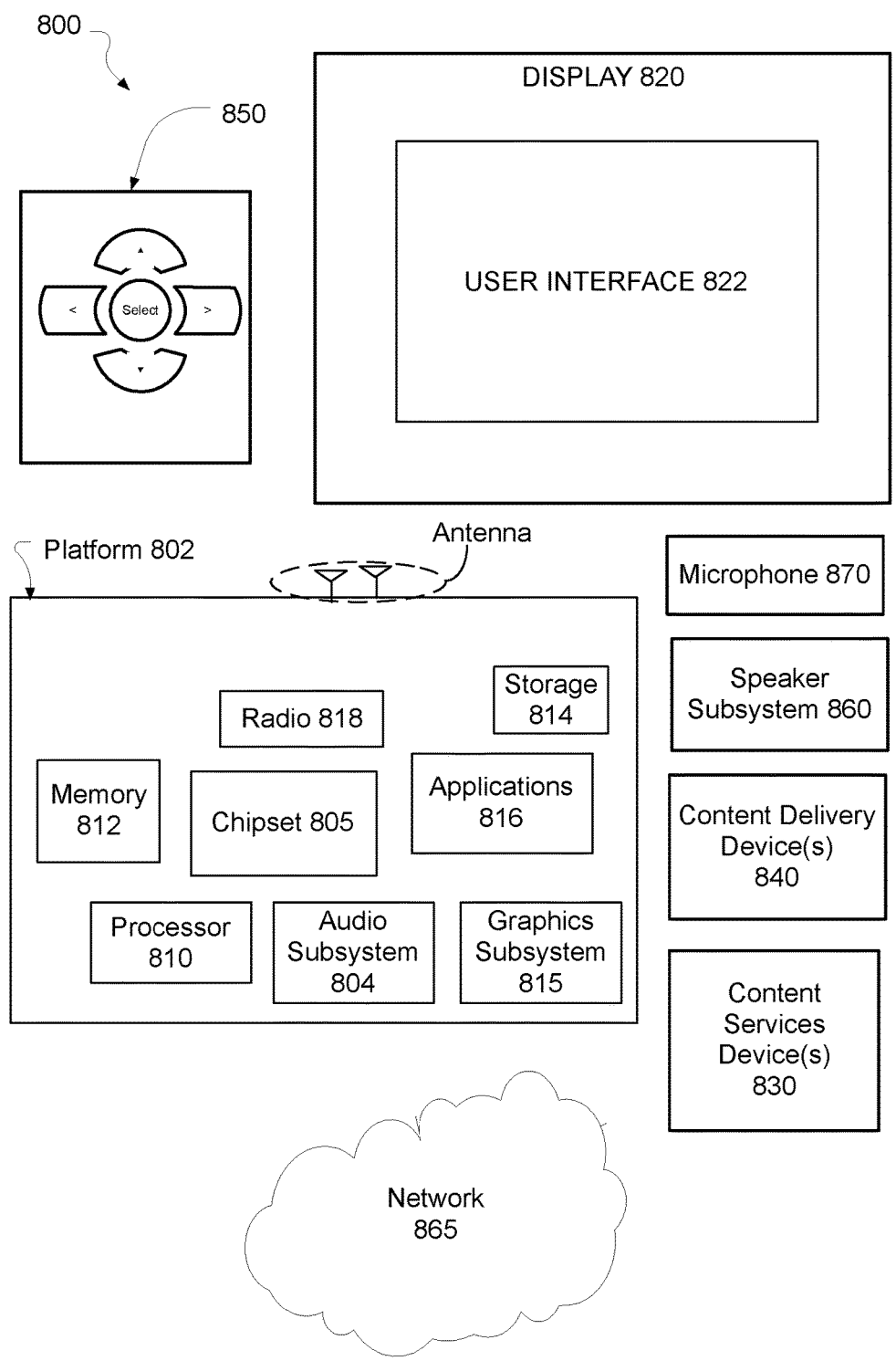
FIG. 8 is an illustrative diagram of another example system.

Referring to FIG. 8, an example system 800 in accordance with the present disclosure operates one or more aspects of the speech recognition system described herein. It will be understood from the nature of the system components described below that such components may be associated with, or used to operate, certain part or parts of the speech recognition system described above. In various implementations, system 800 may be a media system although system 800 is not limited to this context. For example, system 800 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smartwatch, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802, speaker 870, microphone 870, and/or display 820. Each of these components is described in greater detail below.

In various implementations, platform 802 may include any combination of a chipset 805, processor 810, memory 812, storage 814, audio subsystem 804, graphics subsystem 815, applications 816 and/or radio 890. Chipset 805 may provide intercommunication among processor 810, memory 812, storage 814, audio subsystem 804, graphics subsystem 815, applications 816 and/or radio 890. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 810 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Audio subsystem 804 may perform processing of audio such as acoustic signals for speech recognition as described herein and/or voice recognition. The audio subsystem 804 may comprise one or more processing units and accelerators. Such an audio subsystem may be integrated into processor 810 or chipset 805. In some implementations, the audio subsystem 804 may be a stand-alone card communicatively coupled to chipset 805. An interface may be used to communicatively couple the audio subsystem 804 to a speaker 860, microphone 870, and/or display 820.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 890 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 890 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820, speaker 860, and microphone 870. Platform 802 and/or content services device(s) 830 may be coupled to a network 865 to communicate (e.g., send and/or receive) media information to and from network 865. Content delivery device(s) 840 also may be coupled to platform 802, speaker 860, microphone 870, and/or to display 820.

In various implementations, content services device(s) 830 may include a microphone, a cable television box, personal computer, network, telephone, Internet enabled devices or appliance capable of delivering digital information and/or content, and any other similar device capable of unidirectionally or bidirectionally communicating content between content providers and platform 802 and speaker subsystem 860, microphone 870, and/or display 820, via network 865 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 804 also may be used to control the motion of articles or selection of commands on the interface 822.

Movements of the navigation features of controller 850 may be replicated on a display (e.g., display 820) by movements of a pointer, cursor, focus ring, or other visual indicators displayed on the display or by audio commands. For example, under the control of software applications 816, the navigation features located on navigation controller 850 may be mapped to virtual navigation features displayed on user interface 822, for example. In embodiments, controller 850 may not be a separate component but may be integrated into platform 802, speaker subsystem 1260, microphone 870, and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example, or by auditory command. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802, speaker 860, microphone 870, and/or display 820 may be an integrated unit. Display 820, speaker 860, and/or microphone 870 and content service device(s) 830 may be integrated, or display 820, speaker 860, and/or microphone 870 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 8.

Referring to FIG. 11, a small form factor device 900 is one example of the varying physical styles or form factors in which system 800 may be embodied. By this approach, device 900 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 9:
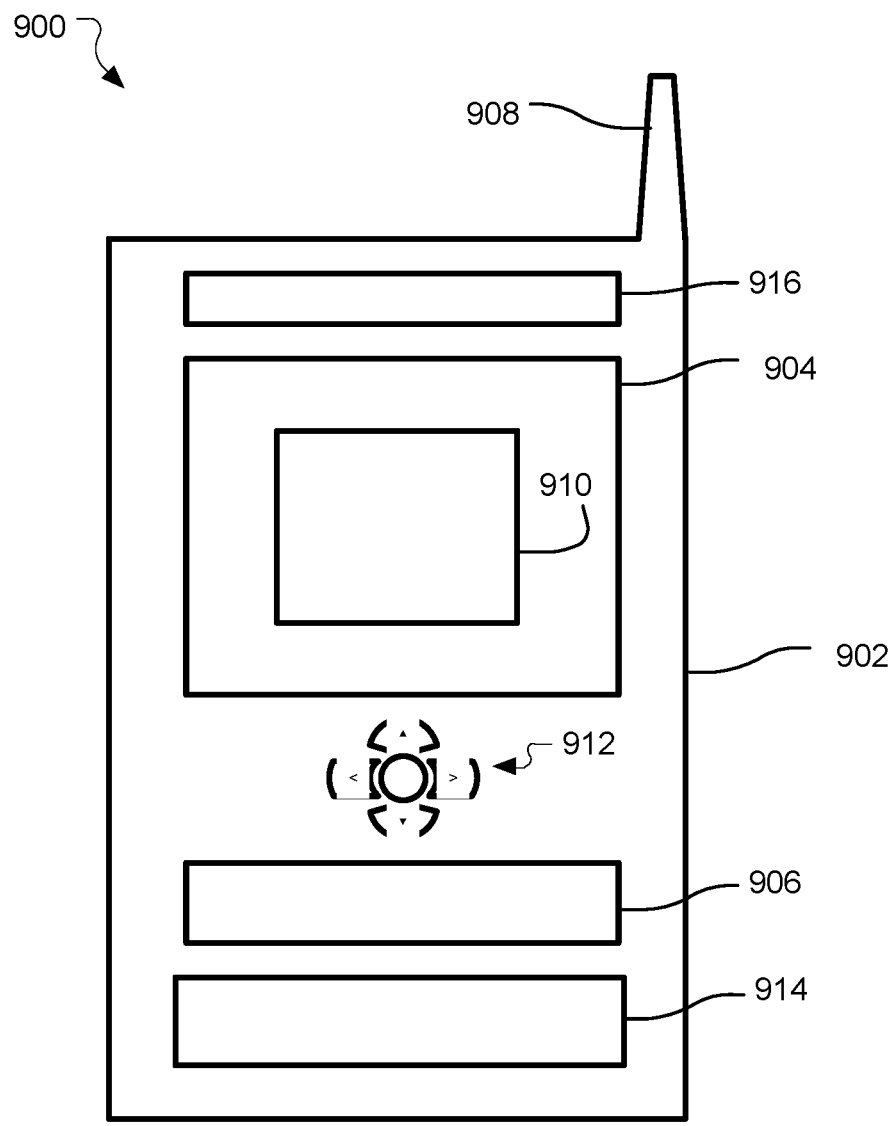
FIG. 9 illustrates another example device, all arranged in accordance with at least some implementations of the present disclosure.

As shown in FIG. 9, device 800 may include a housing 902, a display 904 including a screen 910, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, software and so forth. Information also may be entered into device 900 by way of microphone 914. Such information may be digitized by a speech recognition device as described herein as well as a voice recognition devices and as part of the device 900, and may provide audio responses via a speaker 916 or visual responses via screen 910. The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of speech recognition comprises forming a weighted finite state transducer (WFST) having nodes associated with states and interconnected by arcs, and to identify at least one word or word sequence hypothesis. The method also may comprise identifying multiple sub-graphs on the WFST, each sub-graph having the same arrangement of multiple states and at least one arc, and propagating tokens in parallel through the sub-graphs.

By another implementation, the method also may comprise that the propagating in parallel comprises performing operations with the multiple sub-graphs using single-instruction, multiple-data (SIMD) instructions; wherein the multiple sub-graphs of the WFST are stored on a memory in consecutive storage addresses; and wherein each sub-graph is stored as a supertoken each having an array of tokens. The method may comprise performing parallel processing of supertokens on a frame and that have at least one active token on the frame; forming a dummy token as a place holder for one of the token locations within at least one supertoken to maintain a number of tokens in each supertoken; performing non-parallel propagation of one or more tokens to or from one or more states external to all of the multiple sub-graphs on a frame of the WFST that were processed in parallel; propagating the sub-graphs in parallel without adjusting the structure of the WFST solely to obtain a parallel structure; forming the sub-graphs each having at least one arc interconnecting at least one state; forming each sub-graph with at least one self-loop at one state within the sub-graph; and determining which token or tokens should be dropped at a common destination state of multiple tokens within the sub-graph by using a choosing mask that adjusts the integer values of the acoustic scores being used for the determination. The method also includes that the mask is used to combine acoustic scores of multiple tokens into a single acoustic score; and wherein the propagating comprises updating the score at a destination node within a sub-graph; and wherein propagating tokens in parallel comprises updating the score for a token by factoring a prior score, transition weight, and destination state acoustic score in parallel for multiple sub-graphs stored as active supertokens of a frame.

By yet another implementation, a computer-implemented system of speech recognition comprises at least one acoustic signal receiving unit, at least one processor communicatively connected to the acoustic signal receiving unit, at least one memory communicatively coupled to the at least one processor, and a weighted finite state transducer (WFST) decoder communicatively coupled to the processor. The WFST decoder may be used to form a weighted finite state transducer (WFST) having nodes associated with states and interconnected by arcs, and to identify at least one word or word sequence hypothesis; identify multiple sub-graphs on the WFST, each sub-graph having the same arrangement of multiple states and at least one arc; and propagate tokens in parallel through the sub-graphs.

By another example, the system provides that to propagate in parallel comprises performing operations with the multiple sub-graphs using single-instruction, multiple-data (SIMD) instructions; wherein the multiple sub-graphs of the WFST are stored on a memory in consecutive storage addresses; and wherein each sub-graph is stored as a supertoken each having an array of tokens. The system has the WFST decoder to: perform parallel processing of supertokens on a frame and that have at least one active token on the frame; form a dummy token as a place holder for one of the token locations within at least one supertoken to maintain a number of tokens in each supertoken; perform non-parallel propagation of one or more tokens to or from one or more states external to all of the multiple sub-graphs on a frame of the WFST that were processed in parallel; propagate the sub-graphs in parallel without adjusting the structure of the WFST solely to obtain a parallel structure; form the sub-graphs each having at least one arc interconnecting at least one state; form each sub-graph with at least one self-loop at one state within the sub-graph; and determine which token or tokens should be dropped at a common destination state of multiple tokens within the sub-graph by using a choosing mask that adjusts the integer values of the acoustic scores being used for the determination. The mask is used to combine acoustic scores of multiple tokens into a single acoustic score; wherein to propagate comprises updating the score at a destination node within a sub-graph; and wherein to propagate tokens in parallel comprises updating the score for a token by factoring a prior score, transition weight, and destination state acoustic score in parallel for multiple sub-graphs stored as active supertokens of a frame.

By one approach, at least one computer readable medium comprises a plurality of instructions that in response to being executed on a computing device, causes the computing device to: form a weighted finite state transducer (WFST) having nodes associated with states and interconnected by arcs, and to identify at least one word or word sequence hypothesis; identify multiple sub-graphs on the WFST, each sub-graph having the same arrangement of multiple states and at least one arc; and propagate tokens in parallel through the sub-graphs.

By another approach, the instructions that to propagate in parallel comprises performing operations with the multiple sub-graphs using single-instruction, multiple-data (SIMD) instructions; wherein the multiple sub-graphs of the WFST are stored on a memory in consecutive storage addresses; and wherein each sub-graph is stored as a supertoken each having an array of tokens. The instructions cause the computing device to: perform parallel processing of supertokens on a frame and that have at least one active token on the frame; form a dummy token as a place holder for one of the token locations within at least one supertoken to maintain a number of tokens in each supertoken; perform non-parallel propagation of one or more tokens to or from one or more states external to all of the multiple sub-graphs on a frame of the WFST that were processed in parallel; propagate the sub-graphs in parallel without adjusting the structure of the WFST solely to obtain a parallel structure; form the sub-graphs each having at least one arc interconnecting at least one state; form each sub-graph with at least one self-loop at one state within the sub-graph; and determine which token or tokens should be dropped at a common destination state of multiple tokens within the sub-graph by using a choosing mask that adjusts the integer values of the acoustic scores being used for the determination, wherein the mask is used to combine acoustic scores of multiple tokens into a single acoustic score. Also, to propagate comprises updating the score at a destination node within a sub-graph; and wherein to propagate tokens in parallel comprises updating the score for a token by factoring a prior score, transition weight, and destination state acoustic score in parallel for multiple sub-graphs stored as active supertokens of a frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of speech recognition, comprising:
    forming a weighted finite state transducer (WFST) having nodes associated with states and interconnected by arcs, and to identify at least one word or word sequence hypothesis;
    identifying multiple sub-graphs on the WFST, each sub-graph having the same arrangement of multiple states and at least one arc; and
    propagating tokens in parallel through the sub-graphs, wherein each sub-graph is stored as a supertoken each having an array of tokens.

2. The method of claim 1 wherein the propagating in parallel comprises performing operations with the multiple sub-graphs using single-instruction, multiple-data (SIMD) instructions.

3. The method of claim 1 wherein the multiple sub-graphs of the WFST are stored on a memory in consecutive storage addresses.

4. The method of claim 1 comprising performing parallel processing of supertokens on a frame and that have at least one active token on the frame.

5. The method of claim 1 comprising forming a dummy token as a place holder for one of the token locations within at least one supertoken to maintain a number of tokens in each supertoken.

6. The method of claim 1 comprising performing non-parallel propagation of one or more tokens to or from one or more states external to all of the multiple sub-graphs on a frame of the WFST that were processed in parallel.

7. The method of claim 1 comprising propagating the sub-graphs in parallel without adjusting the structure of the WFST solely to obtain a parallel structure.

8. The method of claim 1 comprising forming the sub-graphs each having at least one arc interconnecting at least one state.

9. The method of claim 1 comprising forming each sub-graph with at least one self-loop at one state within the sub-graph.

10. The method of claim 1 wherein the propagating comprises updating a score at a destination node within a sub-graph.

11. The method of claim 1 wherein propagating tokens in parallel comprises updating a score for a token by factoring a prior score, transition weight, and destination state acoustic score in parallel for multiple sub-graphs stored as active supertokens of a frame.

12. The method of claim 1 comprising determining which token or tokens should be dropped at a common destination state of multiple tokens within the sub-graph by using a choosing mask that adjusts the integer values of acoustic scores being used for the determination.

13. The method of claim 12 wherein the mask is used to combine acoustic scores of multiple tokens into a single acoustic score.

14. The method of claim 1 wherein the propagating in parallel comprises performing operations with the multiple sub-graphs using single-instruction, multiple-data (SIMD) instructions;
    wherein the multiple sub-graphs of the WFST are stored on a memory in consecutive storage addresses;
    the method comprising:
    performing parallel processing of supertokens on a frame and that have at least one active token on the frame;
    forming a dummy token as a place holder for one of the token locations within at least one supertoken to maintain a number of tokens in each supertoken;
    performing non-parallel propagation of one or more tokens to or from one or more states external to all of the multiple sub-graphs on a frame of the WFST that were processed in parallel;
    propagating the sub-graphs in parallel without adjusting the structure of the WFST solely to obtain a parallel structure;
    forming the sub-graphs each having at least one arc interconnecting at least one state;
    forming each sub-graph with at least one self-loop at one state within the sub-graph; and
    determining which token or tokens should be dropped at a common destination state of multiple tokens within the sub-graph by using a choosing mask that adjusts the integer values of acoustic scores being used for the determination, wherein the mask is used to combine acoustic scores of multiple tokens into a single acoustic score;
    wherein the propagating comprises updating a score at a destination node within a sub-graph; and
    wherein propagating tokens in parallel comprises updating a score for a token by factoring a prior score, transition weight, and destination state acoustic score in parallel for multiple sub-graphs stored as active supertokens of a frame.

15. A computer-implemented system of speech recognition comprising:
    at least one acoustic signal receiving unit;
    at least one processor communicatively connected to the acoustic signal receiving unit;
    at least one memory communicatively coupled to the at least one processor; and
    a weighted finite state transducer (WFST) decoder communicatively coupled to the processor, and to:
        form a weighted finite state transducer (WFST) having nodes associated with states and interconnected by arcs, and to identify at least one word or word sequence hypothesis;
        identify multiple sub-graphs on the WFST, each sub-graph having the same arrangement of multiple states and at least one arc; and
        propagate tokens in parallel through the sub-graphs,
    wherein the WFST decoder is to perform non-parallel propagation of one or more tokens to or from one or more states external to all of the multiple sub-graphs on a frame of the WFST that were processed in parallel.

16. The system of claim 15 wherein the propagating in parallel comprises performing operations with the multiple sub-graphs using single-instruction, multiple-data (SIMD) instructions.

17. The system of claim 15 wherein the WFST decoder is to perform parallel processing of supertokens on a frame and that have at least one active token on the frame.

18. The system of claim 15 wherein the WFST decoder is to determine which token or tokens should be dropped at a common destination state of multiple tokens within the sub-graph by using a choosing mask that adjusts the integer values of acoustic scores being used for the determination.

19. The system of claim 15 wherein the multiple sub-graphs of the WFST are stored on a memory in consecutive storage addresses.

20. The system of claim 15 wherein each sub-graph is stored as a supertoken each having an array of tokens, and wherein the WFST decoder is to perform parallel processing of supertokens on a frame and that have at least one active token on the frame.

21. The system of claim 15 wherein to propagate in parallel comprises performing operations with the multiple sub-graphs using single-instruction, multiple-data (SIMD) instructions;
wherein the multiple sub-graphs of the WFST are stored on a memory in consecutive storage addresses;
wherein each sub-graph is stored as a supertoken each having an array of tokens;
the system having the WFST decoder to:
perform parallel processing of supertokens on a frame and that have at least one active token on the frame;
form a dummy token as a place holder for one of the token locations within at least one supertoken to maintain a number of tokens in each supertoken;
propagate the sub-graphs in parallel without adjusting the structure of the WFST solely to obtain a parallel structure;
form the sub-graphs each having at least one arc interconnecting at least one state;
form each sub-graph with at least one self-loop at one state within the sub-graph; and
determine which token or tokens should be dropped at a common destination state of multiple tokens within the sub-graph by using a choosing mask that adjusts the integer values of acoustic scores being used for the determination, wherein the mask is used to combine acoustic scores of multiple tokens into a single acoustic score;
wherein to propagate comprises updating a score at a destination node within a sub-graph; and
wherein to propagate tokens in parallel comprises updating the score for a token by factoring a prior score, transition weight, and destination state acoustic score in parallel for multiple sub-graphs stored as active supertokens of a frame.

22. At least one non-transitory computer readable medium comprising a plurality of instructions that in response to being executed on a computing device, causes the computing device to:
form a weighted finite state transducer (WFST) having nodes associated with states and interconnected by arcs, and to identify at least one word or word sequence hypothesis;
identify multiple sub-graphs on the WFST, each sub-graph having the same arrangement of multiple states and at least one arc; and
propagate tokens in parallel through the sub-graphs,
wherein to propagate tokens in parallel comprises updating a score for a token by factoring a prior score, transition weight, and destination state acoustic score in parallel for multiple sub-graphs stored as active supertokens of a frame.

23. The medium of claim 22 wherein to propagate in parallel comprises performing operations with the multiple sub-graphs using single-instruction, multiple-data (SIMD) instructions;
wherein the multiple sub-graphs of the WFST are stored on a memory in consecutive storage addresses;
wherein each sub-graph is stored as a supertoken each having an array of tokens;
the instructions causing the computing device to:
perform parallel processing of supertokens on a frame and that have at least one active token on the frame;
form a dummy token as a place holder for one of the token locations within at least one supertoken to maintain a number of tokens in each supertoken;
perform non-parallel propagation of one or more tokens to or from one or more states external to all of the multiple sub-graphs on a frame of the WFST that were processed in parallel;
propagate the sub-graphs in parallel without adjusting the structure of the WFST solely to obtain a parallel structure;
form the sub-graphs each having at least one arc interconnecting at least one state;
form each sub-graph with at least one self-loop at one state within the sub-graph; and
determine which token or tokens should be dropped at a common destination state of multiple tokens within the sub-graph by using a choosing mask that adjusts the integer values of acoustic scores being used for the determination, wherein the mask is used to combine acoustic scores of multiple tokens into a single acoustic score;
wherein to propagate comprises updating a score at a destination node within a sub-graph; and
wherein to propagate tokens in parallel comprises updating a score for a token by factoring a prior score, transition weight, and destination state acoustic score in parallel for multiple sub-graphs stored a s active supertokens of a frame.

* * * * *